United States Patent [19]

Stonerook et al.

[11] Patent Number: 5,187,465
[45] Date of Patent: Feb. 16, 1993

[54] METHOD AND APPARATUS FOR TESTING A DUAL AIRBAG PASSIVE RESTRAINT SYSTEM

[75] Inventors: Dana A. Stonerook, Plymouth; Edward J. Abeska, Ferndale; Jeff R. Rochette, Livonia, all of Mich.

[73] Assignee: TRW Inc., Lyndhurst, Ohio

[21] Appl. No.: 589,456

[22] Filed: Sep. 27, 1990

[51] Int. Cl.5 ............................................. B60Q 1/00
[52] U.S. Cl. ................................... 340/438; 307/10.1; 280/735
[58] Field of Search ............... 307/10.1; 340/436, 438; 280/734, 735

[56] References Cited

U.S. PATENT DOCUMENTS

| | | |
|---|---|---|
| 3,668,627 | 6/1972 | Brainerd . |
| 3,714,627 | 1/1973 | Dillman et al. ............... 340/436 X |
| 3,767,002 | 10/1973 | Gillund .............................. 280/735 |
| 3,849,759 | 11/1974 | Hosaka et al. ............... 340/436 X |
| 3,909,777 | 9/1975 | Baba et al. ..................... 340/436 X |
| 4,086,562 | 4/1978 | Hasegawa ...................... 340/436 X |
| 4,366,465 | 12/1982 | Veneziano . |
| 4,673,912 | 6/1987 | Kumasaka et al. . |
| 4,825,148 | 4/1989 | McCurdy et al. ................. 324/64 |
| 4,835,513 | 5/1989 | McCurdy et al. ............... 340/438 |
| 4,851,705 | 7/1989 | Musser et al. . |
| 4,987,316 | 1/1991 | White et al. ................ 280/735 X |
| 4,990,884 | 2/1991 | McCurdy et al. ............... 340/438 |

Primary Examiner—Jin F. Ng
Assistant Examiner—Christine K. Oda
Attorney, Agent, or Firm—Tarolli, Sundheim & Covell

[57] ABSTRACT

A method and apparatus are disclosed for testing a dual airbag passive restraint system of the type having two firing circuits, each with a series connection of several circuit components including at least two inertia sensors connected in series with a squib across a source of electrical energy, each inertia sensor having a normally open switch and an associated parallel connected resistor. The apparatus comprises a series connected diode and two switching circuits for each firing circuit for isolating at least one of the inertia sensors in each of the firing circuits from other circuit components of its associated firing circuit. A microcontroller monitors at least one voltage value at a component connection while at least one inertia sensor in each firing circuit is isolated. The microcontroller determines a value functionally related to the resistance of at least one circuit component in each firing circuit while at least one inertia sensor is isolated. The microcontroller compares the determined value against predetermined limits. If the determined value is not within the predetermined limits, an error indication is provided.

19 Claims, 3 Drawing Sheets

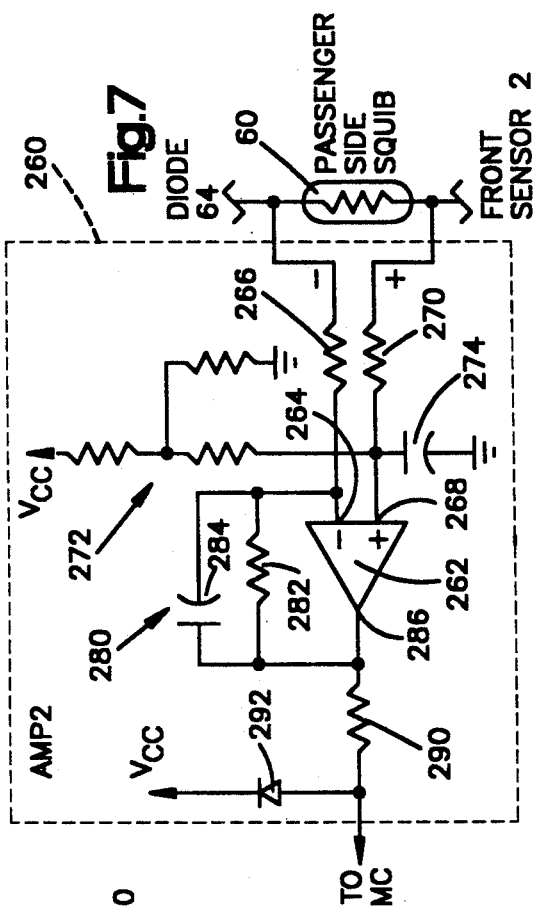
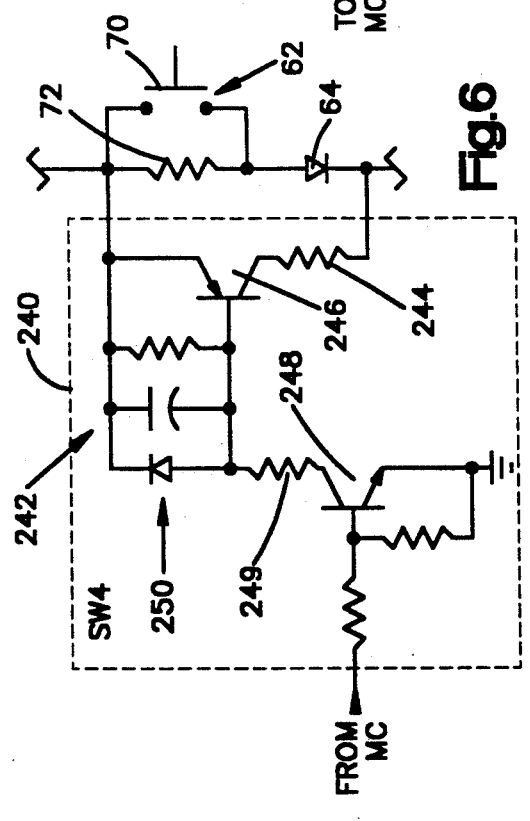
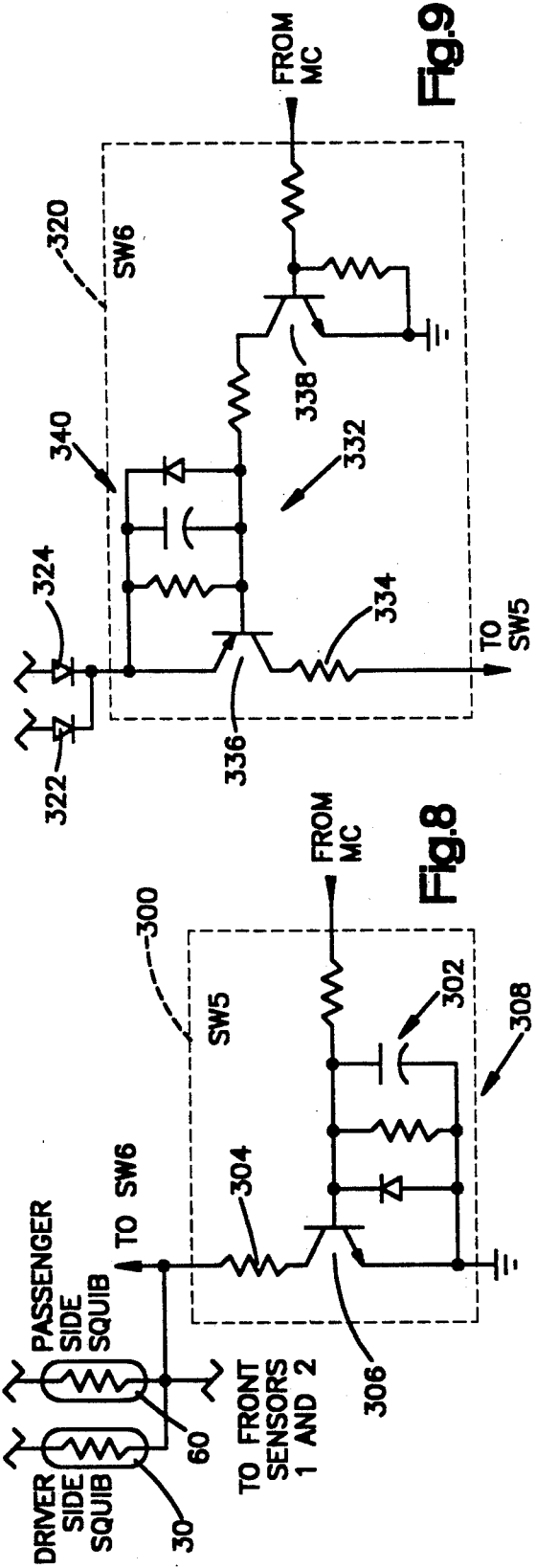

METHOD AND APPARATUS FOR TESTING A DUAL AIRBAG PASSIVE RESTRAINT SYSTEM

TECHNICAL FIELD

The present invention relates to diagnostic testing of an airbag passive restraint system and is particularly directed to a method and apparatus for testing an airbag restraint system having both driver and passenger side airbags.

BACKGROUND ART

Airbag passive restraint systems for passenger vehicles are known. These systems typically include a firing circuit having a squib and two normally open inertia switches, all connected in series across a source of electrical energy. The two inertia switches are know in the art as the safing sensor and the front sensor. The safing sensor is located in the passenger compartment and the front sensor is located near the front of the vehicle. Upon closure of the two inertia switches, as occurs during a vehicle crash, electrical current of sufficient magnitude and duration passes through the squib so as to ignite the squib. The squib, when ignited, ignites a combustible gas generating composition or pierces a container of pressurized gas which results in inflation of the airbag.

If the firing circuit in an airbag restraint system is non-operative, the airbag would not be deployed upon the occurrence of a crash condition. Such non-operative conditions, for example, include (i) an open circuit in the series connection of the squib and the two inertia switches, or (ii) a short circuited squib. Also, a non-operative condition exists if excessive impedance exists in connections between firing circuit components so that upon closure of the inertia switches, the squib does not draw enough current to fire the squib.

Diagnostic test circuits have been developed to monitor the operativeness of the firing circuit portion of the airbag passive restraint system. If a non-operative condition is detected in the firing circuit, the diagnostic circuits alert the vehicle operator by lighting a warning lamp. Such diagnostic test circuits are disclosed in U.S. Pat. No. 4,835,513 to McCurdy et al., and in U.S. Pat. No. 4,825,148 to McCurdy et al., both assigned to the assignee of the present invention, both of which are hereby fully incorporated herein by reference. Both the '513 patent and the '148 patent are directed to vehicle restraint systems having only one airbag, preferably on the driver side.

These known diagnostic circuits separately monitor certain parameters of various components in the firing circuit, including the two inertia switches, the squib, and the storage capacitor. The diagnostic circuits monitor for both snort and open circuits in the firing circuit and perform tests to determine if resistance or capacitance values of firing circuit components are within predetermined limits. Upon detection of an unacceptable condition in the firing circuit, the circuit alerts the vehicle operator by lighting an indicator lamp located in the passenger compartment. Also, the diagnostic circuits disclosed in the '513 and the '148 patents provide for recording a detected out-of-tolerance condition in an electrically erasable programmable read only memory ("EEPROM") for later analysis by a service technician.

In a passive restraint system having both driver's side and passenger's side airbags, two firing circuits are typically used. In a dual airbag arrangement, it is contemplated that two firing circuits will be used in which certain firing circuit components are shared or connected in parallel. Such an arrangement improves the overall reliability of a dual airbag system. For example, it is contemplated that the front sensors in a dual airbag system can be connected in parallel so as to provide a redundant circuit path between the squibs and the power supply. Even though certain parallel connections are present in the two firing circuits, it is desirable to separately monitor the circuit elements of the two firing circuits as much a possible for diagnostic testing purposes.

SUMMARY OF THE INVENTION

The present invention provides a new method and apparatus for testing a dual airbag restraint system for a passenger vehicle particularly of the type that share certain components in the firing circuit. In accordance with the present invention, certain firing circuit components are electrically isolated from other firing circuit components while a known test current is passed through the isolated components. The voltages at component connection points are monitored and component values are determined.

Specifically, an apparatus is provided for testing a dual airbag passive restraint system of the type having two firing circuits, each with a series connection of several circuit components including at least two inertia sensors connected in series with a squib across a source of electrical energy, each inertia sensor having a normally open switch and an associated parallel connected resistor. The apparatus comprises means for isolating at least one of the inertia sensors in each of the firing circuits from other circuit components of its associated firing circuit. Means are provided for monitoring, in each firing circuit, at least one voltage value at a component connection while the at least one inertia sensor in each firing circuit is isolated. The apparatus further comprises means for determining from the monitored voltage value a value functionally related to the resistance of at least one circuit component in each firing circuit while at least one inertia sensor is isolated. Means are provided for comparing the determined value against predetermined limits. The apparatus further includes means for providing an error indication if the determined value is not within the predetermined limits.

In accordance with a preferred embodiment of the present invention, a dual airbag system is provided comprising a first firing circuit and a second firing circuit, the first firing circuit including a first safing inertia sensor having a first safing inertia switch and a first safing resistor connected in parallel with the first safing inertia switch, one terminal of the first safing inertia switch connected to a source of electrical energy, a first diode having its anode connected to a second terminal of said first safing inertia switch, a first squib having one terminal connected to the cathode of the first diode, a first front inertia sensor having a first front inertia switch and a first front resistor connected in parallel with the first front inertia switch, the first front inertia switch connected to a second terminal of the first squib, the second terminal of said first front inertia switch being connected to electrical ground, the second firing circuit including a second safing inertia sensor having a second safing inertia switch and a second safing resistor connected in parallel with the second safing inertia switch, one terminal of said second safing inertia switch connected to a source of electrical energy, a second diode having its anode connected to a second terminal of said second safing inertia switch, a second squib having one terminal connected to the cathode of the second diode, a second front inertia sensor having a normally open switch and a second front resistor connected in parallel with said second front inertia switch, the second front inertia switch having one terminal connected to the second squib, the second terminal of the second front inertia switch being connected to electrical ground. The first terminal of the first front inertia switch being connected to the first terminal at the second front inertia switch. The dual airbag system further comprises a first switching network connected in parallel across the series connected first safing inertia switch and the first diode, the first switching network including a first actuatable solid state switch connected in series with a first test resistor having a known resistance value for, when actuated, connecting the first test resistor in parallel with the series connection of the first diode and the associated resistor of the first safing inertia switch. The system further includes a second switching network connected between the connection of the first safing inertia switch and the first diode and electrical ground, the second switching network including a second actuatable solid state switch connected in series with a second test resistor having a known resistance value for, when actuated, connecting the junction between the first safing sensor and first diode to electrical ground through the second test resistor. A third switching network is connected in parallel across the series connected second safing inertia switch and the second diode, the third switching network including a third actuatable solid state switch connected in series with a third test resistor having a known resistance value for, when actuated, connecting the third test resistor in parallel with the series connection of the second diode and the associated resistor of the second safing inertia switch. The system further includes a fourth switching network connected between the connection of the second safing inertia switch and the second diode and electrical ground, the fourth switching network including a fourth actuatable solid state switch connected in series with a fourth test resistor having a known resistance value for, when actuated, connecting the junction between the second safing inertia switch and second diode to electrical ground through the fourth test resistor. A fifth switching network is connected between said source of electrical energy and the junction of the first terminal of the first front sensor and the first terminal of the second front inertia switch. The fifth switching network includes a fifth actuatable solid state switch connected in series with a fifth test resistor having a known resistance value. A sixth switching network is connected between the junction of the first terminal of the first front inertia switch and the first terminal of the second front inertia switch and electrical ground. The sixth switching network includes a sixth actuatable solid state switch connected in series with a sixth test resistor having a known resistance value. Means are provided for controlling the first, second, third, fourth, fifth and sixth solid state switches so as to selectively reverse bias the first and second diodes and establish known test currents selectively though the parallel connected resistors of the first and second safing sensors and the parallel connected resistors of the first and second front sensors. Means are provided for monitoring the voltage values of the source of electrical energy and the voltage value present at selected circuit junctions. The system further includes means for determining the resistance values of selected sensors based upon the monitored voltage values.

A method is provided in accordance with the present invention for testing a dual airbag passive restraint system of the type having two firing circuits, each with a series connection of several circuit components including at least two inertia sensors connected in series with a squib across a source of electrical energy, each inertia sensor having a normally open switch and an associated parallel connected resistor. The method comprises the steps of isolating at least one of the inertia sensors in each of the firing circuits from other circuit components of its associated firing circuit, monitoring, in each firing circuit, at least one voltage value at a component connection while the at least one inertia sensor in each firing circuit is isolated, determining from the monitored voltage value a value functionally related to the resistance of at least one inertia sensor in each firing circuit while the at least one inertia sensor is isolated, comparing the determined value against predetermined limits, and providing an error indication if the determined value is not within the predetermined limits.

BRIEF DESCRIPTION OF THE DRAWINGS

Further features and advantages of the present invention will become apparent to those skilled in the art to which the present invention relates from reading the following specification with reference to the accompanying drawings, in which:

FIGS. 2-9 are schematic illustrations showing certain portions of the apparatus of FIG. 1 in greater detail.

DESCRIPTION OF PREFERRED EMBODIMENT

Figure 1:
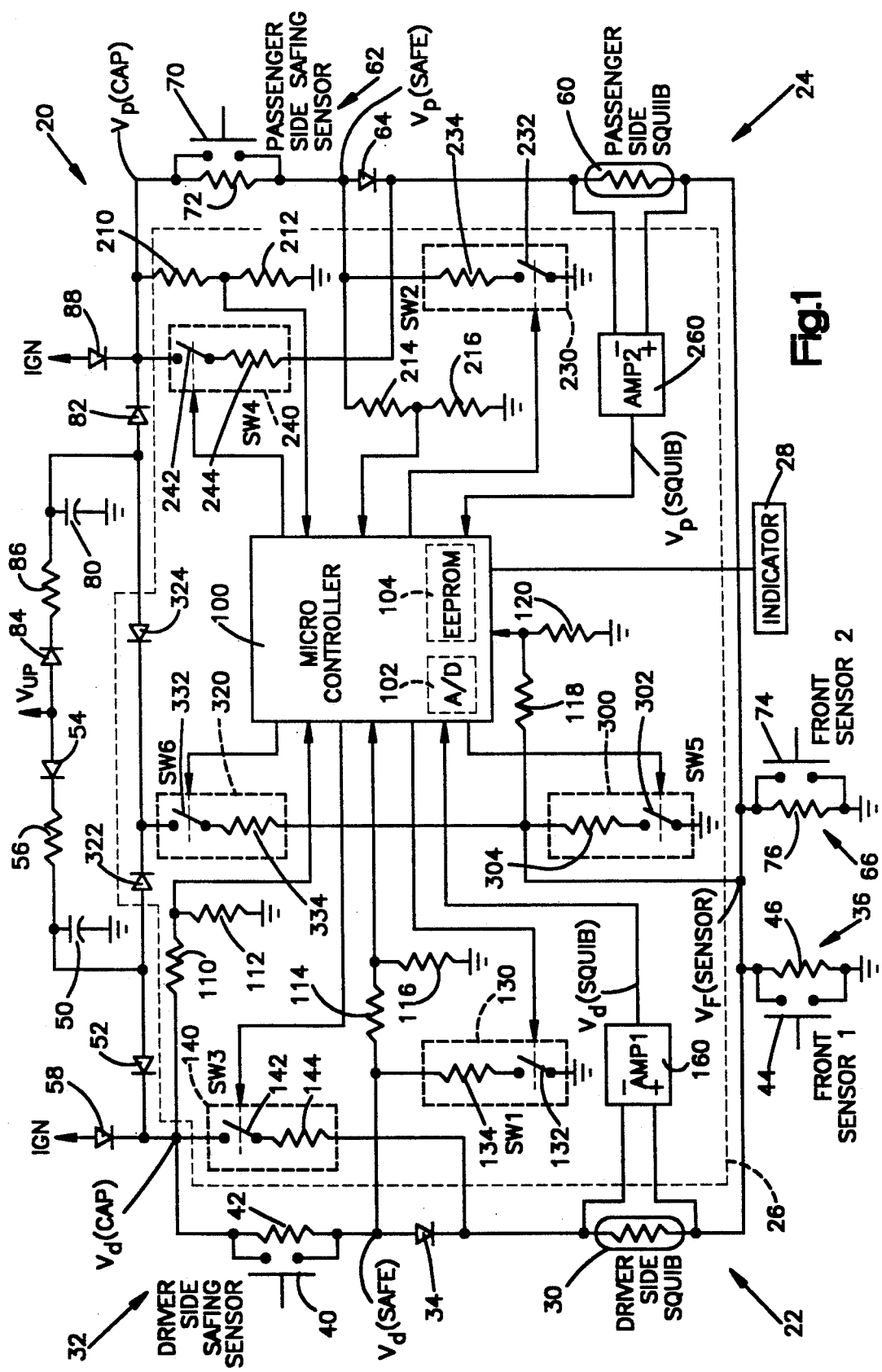
FIG. 1 is a schematic illustration of an apparatus for testing an airbag restraint system made in accordance with the present invention.

Referring to FIG. 1, a dual airbag restraint system 20, made in accordance with the present invention, is shown. The dual airbag system 20 includes a driver's side firing circuit 22 and a passenger's side firing circuit 24. A diagnostic circuit 26 monitors the operativeness of the firing circuits 22, 24. An indicator 28, such as a light or buzzer, located in the passenger compartment of the vehicle, is energized by the diagnostic circuit 26 if an unacceptable condition is detected in one of the firing circuits 22, 24.

The firing circuit 22 includes a driver's side squib 30 connected in series with a driver's side safing sensor 32, a diode 34, and a driver's side front sensor 36, also referred to as front sensor 1. The safing sensor 32 includes a normally open inertia switch 40 and a parallel connected resistor 42. The front sensor 36 includes a normally open inertia switch 44 and a parallel connected resistor 46.

One terminal of the front sensor 36 is connected to electrical ground. One terminal of the safing sensor 32 is connected to one terminal of a driver's side storage capacitor 50 through a diode 52. The other terminal of the storage capacitor is connected to electrical ground. The storage capacitor 50 acts as a source of electrical energy for the firing circuit 22. The capacitor 50 is connected to the output of a voltage upconverter (not shown) through a diode 54 and resistor 56.

The voltage upconverter is connected to the vehicle's battery. The purpose of the voltage upconverter is to provide a source for charging the storage capacitor 50 to a voltage value substantially greater than the voltage value of the vehicle's battery. Such a voltage upconverter is disclosed in U.S. Pat. No. 4,814,684 to Mc-Curdy, assigned to the assignee of the present invention, and is hereby fully incorporated herein by reference.

The junction between diode 52 and safing sensor 32 is connected to the vehicle battery through the vehicle's ignition switch and diode 58. The vehicle battery functions as the primary energy source. The storage capacitor 50 functions as a back-up energy source should the battery connection be lost.

The firing circuit 24 includes a passenger's side squib 60 connected in series with a passenger's side safing sensor 62, a diode 64, and a passenger's side front sensor 66. The safing sensor 62 includes a normally open inertia switch 70 and a parallel connected resistor 72. The front sensor 66 includes a normally open inertia switch 74 and a parallel connected resistor 76.

One terminal of the front sensor 66 is connected to electrical ground. One terminal of the safing sensor 62 is connected to one terminal of a passenger's side storage capacitor 80 through a diode 82. The other terminal of the storage capacitor 80 is connected to electrical ground. The storage capacitor 80 acts as a source of electrical energy for the firing circuit 24. The capacitor 80 is connected to the output of the voltage upconverter through a diode 84 and resistor 86.

The voltage upconverter charges the storage capacitor 80 to a voltage value substantially greater than the value of the vehicle battery voltage. The junction between diode 82 and safing sensor 62 is connected to the vehicle battery via the ignition switch and diode 88. The vehicle battery functions as the primary energy source. The storage capacitor 80 functions as the back-up energy source should the battery connection be lost.

The resistors 42, 46 in the driver's side firing circuit 22 permit a test current to flow through the firing circuit 22. The value of the resistors 42, 46 are selected so that the test current through the resistors 42, 46, and the squib 30 is less than that required to fire the squib 30. The resistors 72, 76 in the passenger's side firing circuit 24 permit a test current to flow through the firing circuit 24. The value of the resistors 72, 76 are selected so that the test current through the resistors 72, 76, and the squib 60 is less than that required to fire the squib 60.

The diagnostic circuit 26 is connected to and monitors various circuit connection locations in the two firing circuits 22, 24. If the diagnostic circuit 26 determines that an unacceptable or out-of-tolerance condition exists in either of the two firing circuits 22, 24, it provides a warning to the vehicle operator via the indicator 28 and records the occurrence in an internal electronic memory.

The diagnostic circuit 26 includes a microcontroller 100 of the type having an internal analog-to-digital ("A/D") converter 102 and an internal EEPROM 104. One such microcontroller is manufactured by Motorola Inc., under part No. MC68HC05B6.

The junction between the diode 52 and the safing sensor 32 is connected to the A/D converter 102 of the microcontroller 100 through a resistor dividing network 110, 112. The voltage at the junction of the diode 52 and the safing sensor 32, referred to herein as $V_d(CAP)$, is equal to the voltage across the capacitor 50 less the voltage drop across the diode 52.

The junction between the safing sensor 32 and the diode 34 is connected to the A/D converter 102 of the microcontroller 100 through a resistor dividing network 114, 116. The voltage at the junction between the safing sensor 32 and the diode 34 is referred to herein as $V_d(SAFE)$.

The junction between the driver's side squib 30 and the front sensor 36 is connected to the A/D converter 102 of the microcontroller 100 through a resistor dividing network 118, 120. The voltage at the junction between the squib 30 and the front sensor 36 is referred to herein as $V_F(SENSOR)$.

A first controllable switching circuit 130, referred to herein as SW1, has one terminal connected to the junction of the safing sensor 32 and the diode 34 and another terminal connected to electrical ground. The switch SW1 includes an electrically controllable, normally open switch 132 operatively connected to an output of the microcontroller 100. A resistor 134 is connected in series with the switch 132.

Figure 2:
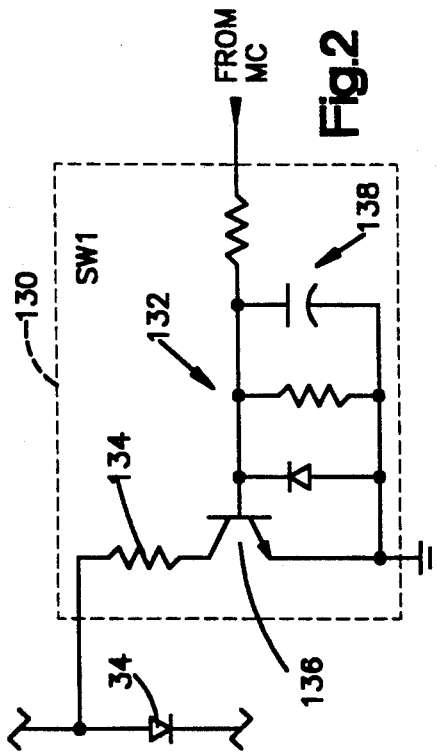

Referring to FIG. 2, the switch 132 includes an NPN transistor 136 having its base connected to an output of the microcontroller 100 through filter circuitry 138. The emitter is connected to electrical ground and the collector is connected to resistor 134. When the transistor 136 is switched ON, the junction between the safing sensor 32 and diode 34 is connected to electrical ground through resistor 134.

A second controllable switch 140, referred to herein as SW3, has one terminal connected to the junction of diode 52 and the safing sensor 32 and a second terminal connected to the junction of diode 34 and the driver's side squib 30. The switch SW3 includes an electrically controllable, normally open switch 142 operatively connected to an output of the microcontroller 100. A resistor 144 is connected in series with the switch 142.

Figure 3:
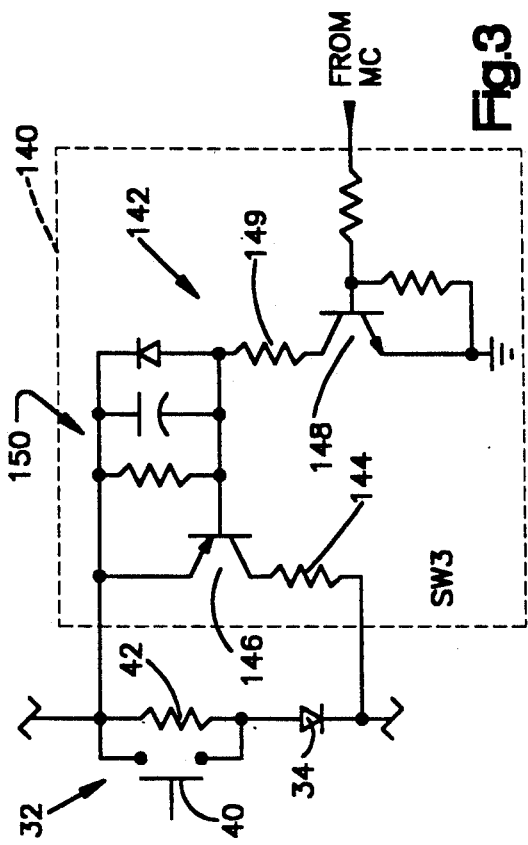

Referring to FIG. 3, the switch 142 includes a PNP transistor 146 having its base connected to a resistor 149 which has its other terminal connected to the collector of a NPN transistor 148 through appropriate filter circuitry 150. The emitter of transistor 146 is connected to the junction of the safing sensor 32 and the diode 52. The collector of transistor 146 is connected to the resistor 144. The base of transistor 148 is controllably connected to the microcontroller 100.

When the microcontroller 100 switches ON transistor 148, transistor 146 is switched On. When transistor 146 is switched ON, the junction of diode 52 and inertia switch 32 is connected to the junction of diode 34 and the driver's side squib 30 through resistor 144.

Resistors 134 and 144 are selected to have resistance values equal to each other and significantly lower than the resistances of sensor resistors 42 and the parallel combination of 46, 76, e.g., only one-fifth the resistance of the sensor resistors. Then, when switches SW1 and SW3 are closed, the voltage at the anode of diode 34 will be less than the voltage at the cathode of diode 34, whereby diode 34 will be reverse-biased.

A differential amplifier circuit 160, referred to herein as AMP1, is operatively connected across the driver's side squib 30. The amplifier 160 outputs a voltage signal defined as $V_d(SQUIB)$ to the A/D converter 102 of the microcontroller 100. The output of amplifier 160 is a voltage value functionally related to the voltage drop across the squib 30. The voltage drop across the squib 30 is functionally related to the impedance of the squib 30.

Figure 4:
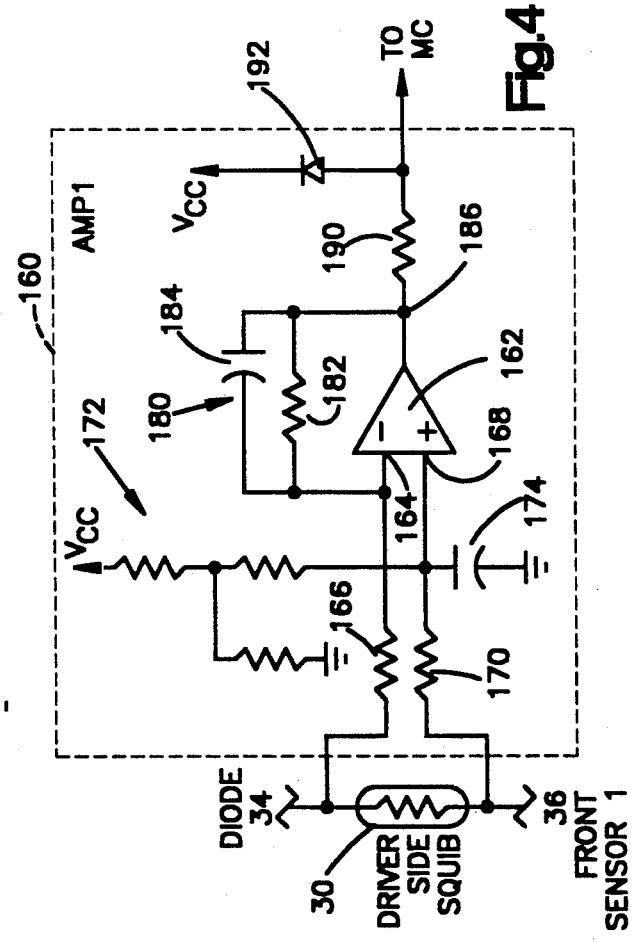

Referring to FIG. 4, AMP1 includes an op amp 162 having its inverting input 164 connected to the junction between diode 34 and the squib 30 through a resistor 166. The non-inverting input 168 of the op amp 162 is connected to the junction of the squib 30 and the front sensor 36 through a resistor 170. The non-inverting input of op amp 162 is biased by a voltage source $V_{cc}$ through a resistor network 172. The value of the bias voltage source $V_{cc}$ is typically 5 VDC. The non-inverting input 168 of the op amp 162 is further connected to a filter capacitor 174.

The op amp 162 has a feedback network 180 in the form of a resistor 182 and capacitor 184 connected in parallel between the output 186 of the op amp 162 and the inverting input 164. The output 186 of the op amp 162 is fed to the A/D converter 102 of the microcontroller 100 through a resistor 190. A diode 192 is connected to the microcontroller side of the resistor 186 and to $V_{cc}$ so as to limit the maximum voltage input to the microcontroller 100 to $V_{cc}$ plus the voltage drop across the diode 192.

The junction between the diode 82 and the passenger's side safing sensor 62 is connected to the A/D converter 102 of the microcontroller 100 through a resistor dividing network 210, 212. The voltage present at the junction of the diode 82 and the safing sensor 62, referred to herein as $V_p(CAP)$, is equal to the voltage across the capacitor 80 less the voltage drop across the diode 82.

The junction between the safing sensor 62 and the diode 64 is connected to the A/D converter 102 of the microcontroller 100 through a resistor dividing network 214, 216. The voltage present at the junction between the safing sensor 62 and the diode 64 is defined to be $V_p(SAFE)$.

The junction between the passenger's side squib 60 and the front sensor 66 is connected to the A/D converter 102 of the microcontroller 100 through a resistor dividing network 118, 120 as described above. The voltage present at the junction between the squib 60 and the front sensor 66 is referred to herein as $V_F(SENSOR)$ as described above.

A controllable switching circuit 230, referred to herein as SW2, has one terminal connected to the junction of the safing sensor 62 and the diode 64 and a second terminal connected to electrical ground. The switch SW2 includes an electrically controllable, normally open switch 232 operatively connected to an output of the microcontroller 100. The switch 232 is connected in series with resistor 234.

Figure 5:
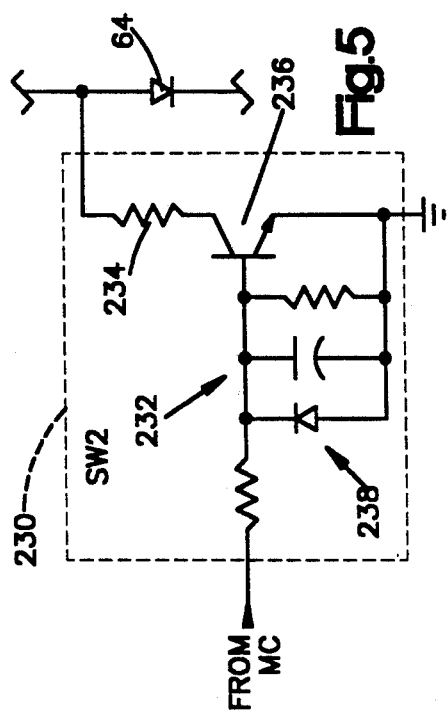

Referring to FIG. 5, the switch 232 includes an NPN transistor 236 having its base connected to an output of the microcontroller 100 through filter circuitry 238. The collector of transistor 236 is connected to resistor 234 and the emitter is connected to electrical ground. When the transistor 236 is switched ON, the junction between the safing sensor 62 and diode 64 is connected to electrical ground through resistor 234.

A controllable switch 240, referred to herein as SW4, has one terminal connected to the junction of diode 82 and the safing sensor 62 and a second terminal connected to the junction of diode 64 and the passenger's side squib 60. The switch SW4 includes an electrically controllable, normally open switch 242 operatively connected to an output of the microcontroller 100. The switch 242 is connected in series with a resistor 244.

Referring to FIG. 6, the switch 242 includes a PNP transistor 246 having its base connected to a resistor 249 which has its other terminal connected to the collector of a NPN transistor 248 through appropriate filtering circuitry 250. The emitter of transistor 246 is connected to the junction of diode 82 and safing sensor 62. The collector of transistor 246 is connected to the resistor 244. The base of transistor 248 is controllably connected to the microcontroller 100. The emitter of transistor 248 is connected to electrical ground.

Resistors 234 and 244 are selected to have resistance values equal to each other and significantly lower than the resistances of sensor resistors 72 and the parallel combination of 46, 76, e.g., only one-fifth the resistance of the sensor resistors. Then, when switches SW2 and SW4 are closed the voltage at the anode of diode 64 will be less than the voltage at the cathode of diode 64, whereby diode 64 will be reverse-biased.

A differential amplifier circuit 260, also referred to herein as AMP2, is operatively connected across the passenger's side squib 60 and outputs a voltage signal (referred to herein as $V_p(SQUIB)$) to the A/D converter 102 of the microcontroller 100 having a voltage value functionally related to the voltage drop across the squib 60. The voltage drop across the squib 60 is functionally related to the impedance of the squib 60.

Referring to FIG. 7, AMP2 includes an op amp 262 having its inverting input 264 connected to the junction between diode 64 and the squib 60 through a resistor 266. The non-inverting input 268 of the op amp 262 is connected to the junction of the squib 60 and the front sensor 66 through a resistor 270. The non-inverting input 268 is biased by the voltage source $V_{cc}$ through a resistor network 272. The input 268 of the op amp 262 is further connected to a filter capacitor 274.

The op amp 262 further has a feedback network 280 in the form of a resistor 282 and capacitor 284 connected in parallel between the output 286 of the op am 262 and the inverting input 264. The output 286 of the op amp 262 is connected to the A/D converter 102 of the microcontroller 100 through a resistor 290. A diode 292 is connected to the microcontroller side of the resistor 286 and to $V_{cc}$ so as to limit the maximum voltage input t the microcontroller to $V_{cc}$ plus the voltage drop across diode 292.

A controllable switch 300, referred to herein as SW5, has one terminal connected between the junctions of the squibs 30, 60 and the front sensors 36, 66 and its second terminal connected to electrical ground. The controllable switch 300 includes a series connected normally open switch 302 and resistor 304. The switch 302 is controllably connected to an output of the microcontroller 100.

Referring to FIG. 8, the switch 302 includes an NPN transistor 306 having its collector connected to resistor 304 and its emitter connected to electrical ground. The base of the transistor 306 is connected to the microcomputer 100 through filter circuitry 308.

A controllable switch 320, referred to herein as SW6, has one terminal connected to the junction of diodes 322, 324 and its second terminal connected to the junction of the squibs 30, 60 and the front sensors 36, 66. The switch SW6 includes an electrically controllable, normally open switch 332 operatively connected to an output of the microcontroller 100. The switch 332 is connected in series with resistor 334.

Referring to FIG. 9, the switch 332 includes a PNP transistor 336 having its base connected to the collector of an NPN transistor 338 through appropriate filtering circuitry 340. The base of transistor 338 is controllably connected to the microcontroller 100. The emitter of transistor 336 is connected to the junction of diodes 322, 324. The collector of transistor 336 is connected to the resistor 334. The resistance value of resistor 334 is approximately equal to the expected value of the resistance of the safing sensors and the parallel connected front sensors and substantially greater than the resistances of resistors 134, 234. When switches SW1, SW2, and SW6 are closed, diodes 34, 64 are reversed biased.

With the diagnostic circuitry 26 as described, the microcontroller 100, using switches SW1-SW6, evaluates the operativeness of the two firing circuits by determining the values of certain parameters of the circuit components in the firing circuits 22, 24 and comparing the determined values against predetermined limits. The present invention is directed to the determination of component values in the firing circuits 22, 24 by isolating certain firing circuit components from the remainder of the firing circuitry. This is accomplished by reverse-biasing diodes 34, 64 and thereby isolating electrical components on the cathode side of the diodes 34, 64 from the electrical components on the anode side of the diodes 34, 64.

U.S. patent application Ser. No. 449,718 filed Dec. 12, 1989 in the name of McCurdy et al., and assigned to the assignee of the present invention, is hereby incorporated herein by reference. The '718 application describes, in detail, a method of measurement of certain firing circuit component parameters in a single airbag restraint system. Those methods are directly applicable in a dual air bag system and are therefore not repeated here. The tested component parameters include the capacity of the storage capacitors (50 and 80 in a dual airbag system) and the impedance of the squibs (30 and 60 in a dual airbag system). These methods are mentioned here since it is contemplated that they would be incorporated into the dual airbag testing system described herein.

The determination of the component values of the firing circuit elements, such as resistance value, requires the solution of appropriate algorithms based upon known principles and laws of electrical and electronic engineering.

Monitor Tests

The microcomputer first conducts "monitor tests" which are gross measurements performed to detect open and short circuits in the firing circuit. If either a short circuit or an open circuit is detected during the monitor tests, there is no need to determine an actual value of the firing circuit components.

Monitor tests for the driver's squib, the passenger's squib, the driver's safing sensor, the passenger's safing sensor, the driver's capacitor, and the passenger's capacitor are performed as set forth in the '718 application. Such monitor tests are fully applicable in a dual airbag system and will be directly implemented in the dual airbag system. Specifically, the implemented monitor tests will include a driver's squib monitor test, a passenger's squib monitor test, a driver's capacitor monitor test, and a passenger's capacitor monitor test, substantially as described in the '718 application. A failure of any monitor test will result in the microcontroller energizing the indicator 28 and recording the error in the EEPROM 104.

A front sensors monitor test is also performed by monitoring the voltage $V_F(SENSOR)$. A measurement of zero volts at $V_F(SENSOR)$ could result from either (i) the front sensor switches 44, 74 being closed or the sensors 36, 66 being shorted to ground or (ii) the safing sensors 32, 62 being open circuited, i.e., not being connected to either $V_{up}$ or IGN. Although either condition is considered a fault condition, it is useful to determine which of the two conditions exists in the firing circuits. B providing an electrical current path to the front sensors in parallel with the safing sensors, the possibility of the safing sensors being open circuited is removed as a consideration for a no-voltage reading at $V_F(SENSOR)$.

The front sensor monitor test measures the voltage $V_F(SENSOR)$ with switches SW3 and SW4 closed. This provides a parallel current path with the safing sensors 32, 62. With the switches SW3 and SW4 closed, measurements are made of $V_F(SENSOR)$, $V_d(CAP)$, and $V_p(CAP)$. A gross numeric value is then calculated by the microcontroller 100. The gross numeric value has a value functionally related to the resistance of the front sensors 36, 66 in accordance with the following algorithm:

$$\frac{100 \times V_F(SENSOR)}{V_d(CAP) + V_p(CAP)} \text{ (with } SW3, SW4 \text{ closed)} \quad (1)$$

(The number 100 in the numerator of equation (1) is included to simplify calculations by insuring that the result is greater than 1. Each of the equations below involving division includes a numerator multiplier that insures a greater-than-one answer.)

A determination is then made by the microcontroller 100 as to whether the result of equation (1) is less than a predetermined threshold. If it is less than the threshold, it is assumed that the front sensors are short circuited to electrical ground. If a short circuit is detected, the indicator 28 is energized to warn the vehicle operator and the error is recorded in the EEPROM 104 embedded in microcontroller 100.

The microcontroller next tests the resistance values of the sensors 32, 36, 62, 66 to verify that the sensors are properly connected and that resistance due to sensor connections is not greater than a predetermined value. Also diodes 34, 64 are tested.

Safing Sensor Resistance Tests

The next test is a determination of the resistance value of the driver's safing sensor 32. To accomplish this test, switches SW3 and SW1 are closed. Since the resistance values of resistors 134 and 144 are lower than the values of resistors 42 and 46, 76, diode 34 will be reverse biased and the test current path will be through the safing sensor 32 and the resistor 134 only. The back biasing of the diode 34 effectively removes the front sensors 36, 66 and the passenger safing sensor 62 from the test circuit. With SW3 and SW1 closed, measurements are made of $V_d(CAP)$ and $V_d(SAFE)$. The resistance value of the driver's safing sensor is determined in accordance with the following equation:

$$\frac{100 \times V_d(CAP)}{V_d(SAFE)} \text{ (with } SW1, SW3 \text{ closed)} \quad (2)$$

The microcontroller then determines whether the result of equation (2) is within a range or "window" of acceptable values. To be within the window, the result must be greater than a predetermined lower threshold and less than a predetermined upper threshold. If the result is not within the limits, the indicator light 28 is energized and the error is recorded in the EEPROM 104.

The next test is a determination of the resistance value of the passenger's safing sensor 62. To perform this test, switches SW2 and SW4 are closed. Again, since the resistance values of resistors 234 and 244 are lower than the values of resistors 72 and 76, 46, diode 64 will be reverse biased and the test current path will be through the safing sensor 62 and the resistor 234 only. The back biasing of the diode 64 effectively removes the front sensors 36, 66 and the driver safing sensor 32 from the test circuit. While SW2 and SW4 are closed, measurements are made of $V_p(CAP)$ and $V_p(SAFE)$. The resistance value of the passenger's safing sensor 62 is determined in accordance with the following equation:

$$\frac{100 \times V_p(CAP)}{V_p(SAFE)} \text{ (with } SW2, SW4 \text{ closed)} \quad (3)$$

The microcontroller then determines whether the result of equation (3) is within the predetermined window. If the result is not within the window limits, the indicator light 28 is energized and the error is recorded in the EEPROM 104.

Diode Test

The next test performed by the microcontroller is to determine whether the diode 34 is open circuited. To perform this test, the switch SW5 is closed and measurements of $V_d(SAFE)$ and $V_F(SENSOR)$ are made. A value is then calculated in accordance with the following algorithm:

$$V_d(SAFE) - V_F(SENSOR) \text{ (with SW5 closed)} \quad (4)$$

The microcontroller then determines whether the result of equation (4) is greater than a predetermined threshold. If the result is too high, the microcontroller concludes that diode 34 is open circuited, whereupon the indicator light 28 is energized and the error is recorded in the EEPROM 104.

The next test performed by the microcontroller is to determine whether the diode 64 is open circuited. To perform this test, the switch SW5 is closed and measurements of $V_p(SAFE)$ and $V_F(SENSOR)$ are made. A value is then calculated in accordance with the following algorithm:

$$V_p(SAFE) - V_F(SENSOR) \text{ (with SW5 closed)} \quad (5)$$

The microcontroller then determines whether the result of equation (5) is greater than a predetermined threshold. If the result is above the threshold, the microcontroller concludes that diode 64 is open circuited, whereupon the indicator light 28 is energized and the error is recorded in the EEPROM 104.

Front Sensor Resistance Test

The next test performed by the microcontroller 100 is to determine the resistance of the front sensors 36, 66. To perform this test, measurements are made of $V_F(SENSOR)$ with SW1, SW2, SW6 closed. With SW1, SW2, and SW6 closed, diodes 34, 64 are reversed biased. This isolates the front sensors from the safing sensors. Also, $V_d(CAP)$ and $V_p(CAP)$ are measured and the greater of the two values is used to solve the following algorithm:

$$\frac{500 \times V_F(SENSOR)}{V_{greater}(CAP) - V_F(SENSOR)} \quad (6)$$

(with $SW1$, $SW2$, $SW6$ closed)

The microcontroller then determines whether the value determined by equation (6) is less than a lower threshold (e.g., 900) within a window (e.g., between 1679 and 3382), or greater than an upper threshold (e.g., the 3382). If less than the lower threshold, it is assumed than one or both of the front sensors 36, 66 is short circuited. If within the window, it is assumed that one of the front sensors 36, 66 is open circuited. If greater than the upper threshold, it is assumed that both of the front sensors 36, 66 are open circuited. If the value determined in equation (6) is not within the window (e.g., between 1679 and 3382), the indicator 28 is energized and the error is recorded in the EEPROM 104. Depending on the determined value, the recorded error signal in the EEPROM will indicate an open, a short, or an improper impedance.

Squib Resistance Test

The next test performed by the microcontroller is a determination of the resistance of the driver's side squib 30. To perform this test, measurements are made of $V_d(SQUIB)$ with SW2 closed, $V_d(SQUIB)$ with SW2, SW3, and SW5 closed, and $V_d(CAP)$. The microcontroller 100 then calculates a value in accordance with the following algorithm:

$$\frac{328 \times ((V_d(SQUIB) \text{ with } SW2 \text{ closed}) - (V_d(SQUIB) \text{ with } SW2, SW3, SW5 \text{ closed}))}{V_d(CAP)} \quad (7)$$

The microcontroller 100 then determines whether the value determined in equation (7) is within a predetermined window. If not within the window, the indicator 28 is energized and the error is recorded in the EEPROM 104. The equation (7) is similar to that set forth in the above-incorporated U.S. Pat. No. 4,825,148. By providing the diode 64 in the passenger's side firing circuit and closing switch SW2, the passenger's side firing circuit is isolated from the driver's side firing circuit. The test current through the squib 30 when SW2 is closed is through resistors 42, 46 and 76. When the switches SW2, SW3 and SW5 are closed, current through the squib 30 is through resistor 144 in parallel with 42 and resistor 304 in parallel with 46 and 76. With this arrangement, equation (7) is indicative of the squib resistance as is fully described in the '148 patent.

The next test performed by the microcontroller is a determination of the resistance of the passenger's side squib 60. To accomplish this test, measurements are made of $V_p(SQUIB)$ with SW1 closed, $V_p(SQUIB)$ with SW1, SW4, and SW5 closed, and $V_p(CAP)$. The microcontroller 100 then determines a value in accordance with the following algorithm:

$$\frac{328 \times (V_p(SQUIB) \text{ (with } SW1 \text{ closed}) - V_p(SQUIB) \text{ (with } SW1, SW4, SW5 \text{ closed}))}{V_p(CAP)} \quad (8)$$

The microcontroller 100 then determines whether the value determined in equation (8) is within a predetermined window. If not within the window the indicator 28 is energized and the error is recorded in the EEPROM 104. In a similar manner as described above with regard to the driver's side squib, closing switch SW1 isolates the driver's side firing circuit from the passenger's side firing circuit. With SW1 closed, the resistance of the passenger's side squib is determined in accordance with equation (8), the theory of which is fully explained in the '148 patent.

It should be appreciated that the window limits used in equations (7) and (8) will typically be different. This arises from the fact that the resistance values of the squibs 30, 60 are very small, e.g. 2 ohms. The driver's side airbag is mounted in the vehicle steering wheel. The resistance due to clock spring connections in the steering wheel must be considered in the equation.

Capacitor Tests

The tests for the driver's capacitor 50 and the passenger's capacitor 80 are conducted simultaneously with the testing of the resistive components. A detailed explanation of the capacitor test is set forth in the above-incorporated '718 application. The test described in the '718 application for a single airbag system is equally applicable for a dual airbag system.

It should be appreciated that the present invention has provided a method and apparatus for isolating certain circuit components in the firing circuits of a dual airbag system for individual testing purposes. The method and apparatus of the present invention does not, however, disable the firing circuit at an time during the testing process. Although the diodes 34 and 64 are back biased during certain tests, closure of the safing sensors due to a crash condition shorts out the test switches SW3 and SW4 thereby permitting the normal current firing path through the safing and front sensor.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. An apparatus for testing a dual airbag passive restraint system having two firing circuits, each one of said firing circuits having a series connection of several circuit components including at least two inertia sensors connected in series with a squib across a source of electrical energy, each one of said inertia sensors having a normally open switch and an associated parallel connected resistor, said apparatus comprising:

means for isolating at least one of the inertia sensors in at least one of the firing circuits from the other circuit components of the associated firing circuit;

means for monitoring, in said at least one firing circuit, at least one voltage value at a component connection while said at least one inertia sensor is isolated;

means for determining from the monitored voltage value a value functionally related to the resistance of at least one circuit component in said at least one firing circuit while said at least one inertia sensor is isolated;

means for comparing the determined value against predetermined limits; and means for providing an error indication if the determined value is not within the predetermined limits.

2. The apparatus of claim 1 wherein said means for isolating includes a series connected diode, each said firing circuit having an associated one of said series diodes connected so that a first one of said two inertia sensors of each said firing circuit is connected to the anode of said associated diode, the cathode of said associated diode being connected to one terminal of the squib, and a second one of said two inertia sensors connected to a second terminal of the squib, said means for isolating further including a switching circuit in each firing circuit, each said switching circuit including a normally open switch, for, when closed, reverse biasing the associated diode.

3. The apparatus of claim 2 wherein each said switching circuit includes a first switching circuit connected in parallel with the series connected associated first inertia sensor and the associated diode and a second switching circuit connected to the anode of the associated diode and to a second terminal of the associated second inertia sensor for, when said first and second switching circuits are actuated, reverse biasing the associated diode and establishing a known test current through the parallel connected resistor associated with said first inertia sensor.

4. The apparatus of claim 3 wherein said means for monitoring includes means to monitor in each said firing circuit the voltage at the associated junction between the anode of said associated diode and said associated first inertia sensor connected in series in said firing circuit and wherein said means for determining determines a value functionally related to the value of the parallel connected resistor associated with the associated first inertia sensor for said firing circuit.

5. The apparatus of claim 3 wherein the second inertia switches of each of the firing circuits are connected in parallel with each other and further including a third switching circuit including a normally open switch and a series connected resistor connected between said source of electrical energy and the parallel connected second inertia switches and wherein said means for monitoring includes means to monitor the voltage at the junction between said squib and said parallel connected second inertia sensors when said second and third switching circuits are closed and said means for determining determines the resistance of the parallel connected resistor associated with the parallel connected second inertia sensors.

6. The apparatus of claim 2 further including a second switching circuit including a normally open switch and a series connected resistor connected between the junction of each said squib and said second inertia switch and electrical ground and wherein said means for monitoring includes means for monitoring when the second switching circuit is closed the voltage present at the anode of the diode in each said firing circuit and at the junction between the squib and the second inertia sensor in each said firing circuit and wherein said means for determining further includes means for determining a difference between the two monitored voltages in each said firing circuit and wherein said means for comparing compares the difference against said predetermined limits.

7. An apparatus for testing a dual airbag passive restraint system having two firing circuits, each with a series connection of several circuit components including at least two inertia sensors connected in series with a squib across a source of electrical energy, each said inertia sensor having a normally open switch and an associated parallel connected resistor so that a first test current having a value is established through both of the parallel connected resistors associated with said at least two inertia sensors, said apparatus comprising:
  means for isolating at least one of the inertia sensors in each of the firing circuits from the other circuit components of the associated firing circuit;
  means for establishing a second test current through said at least one isolated inertia sensor in each said firing circuit having a different value from said first test current value;
  means for monitoring a voltage value developed across the parallel connected resistor associated with said at least one isolated inertia sensor when said second test current passes therethrough;
  means for determining a value functionally related to the resistance of said at least one isolated inertia sensor from said monitored voltage value;
  means for comparing the determined value against predetermined limits; and
  means for providing an error indication if the determined value is not with the predetermined limits.

8. The apparatus of claim 7 wherein each said firing circuit includes an associated series diode connected so that a first one of said two inertia sensors of each firing circuit is connected to the anode of a diode, the cathode of said diode being connected to one terminal of the squib, and a second one of said two inertia sensors connected to a second terminal of the associated squib, said means for isolating further including an isolation switching circuit for, when closed, reverse biasing said diode, each firing circuit having an associated isolation switching circuit.

9. The apparatus of claim 8 wherein each said isolation switching circuit includes a first switching circuit connected in parallel with the series connected first inertia sensor and said associated series diode in the associated firing circuit, each said first switching circuit including a first normally open test switch and a series connected resistor, said isolation switching circuit further including a second switching circuit including a second normally open test switch and a series connected resistor, said second switching circuit having one terminal connected to the anode of said associated diode in said associated firing circuit and a second terminal connected to electrical ground for, when said first and second switching circuits are actuated, reverse biasing said associated diode in said associated firing circuit and establishing said second test current through the parallel connected resistor associated with said first inertia sensor and the resistor associated with said second switching circuit, said first and second switching circuits and their associated series connected resistors being said means for establishing a second test current.

10. The apparatus of claim 9 wherein said means for monitoring includes means to monitor in each said firing circuit the voltage at the associated junction between the anode of the associated series diode and the first inertia sensor in said firing circuit and wherein said means for determining determines a value functionally related to the value of the parallel connected resistor associated with the first inertia sensor for said firing circuit.

11. The apparatus of claim 9 wherein said second inertia switches of said firing circuits are connected in parallel with each other and further including a third switching circuit including a normally open switch and a series connected resistor connected between said source of electrical energy and the parallel connected second inertia switches and wherein said means for monitoring includes means to monitor the voltage at the junction between said squib and said second parallel connected inertia sensors when said second and third switching circuits are closed and said means for determining determines the resistance of the parallel connected resistor associated with the parallel connected second inertia sensors in response to the monitored voltage at the junction between the squib and the second parallel connected inertia sensors.

12. The apparatus of claim 9 further including a third switching circuit including a normally open switch and a series connected resistor connected between the junction of each said squib and said second inertia switch and electrical ground and wherein said means for monitoring includes means for monitoring, when the third switching circuit is closed, the voltage present at the anode of the associated series diode in each said firing circuit and at the junction between the squib and the second inertia sensor in each firing circuit and wherein said means for determining further includes means for determining a difference between the two monitored voltages in each said firing circuit and wherein said means for comparing compares the difference against said predetermined limits and further including means for providing an error indication if said difference is not within the predetermined limits.

13. An apparatus for testing a dual airbag passive restraint system having a first firing circuit and a second firing circuit, the first firing circuit including a first safing inertia sensor having a first normally open switch inertia switch and a first safing resistor connected in parallel with the first safing inertia switch, one terminal of the first safing inertia switch connected to a source of electrical energy, a first diode having its anode connected to a second terminal of said first safing inertia switch, a first squib having one terminal connected to the cathode of the first diode, a first front inertia sensor having a first normally open front inertia switch and a first front resistor connected in parallel with the first front inertia switch, the first front inertia sensor switch connected to a second terminal of the first squib, the second terminal of said first front inertia switch being connected to electrical ground, the second firing circuit including a second safing inertia sensor having a second normally open switch and a second safing resistor connected in parallel with the second safing inertia switch, one terminal of said second safing inertia switch connected to said source of electrical energy, a second diode having its anode connected to a second terminal of said second safing inertia switch, a second squib having one terminal connected to the cathode of the second diode, a second front inertia sensor having a second front inertia switch and a second front resistor connected in parallel with said second front inertia switch, a first terminal of the second front inertia switch being connected to the second squib, the second terminal of said second front inertia switch being connected to electrical ground, the first terminal of the first front inertia switch connected to the first terminal of the second front inertia switch and the second terminal of the first and second squibs, said apparatus further comprising:
  a first switching network connected in parallel across said series connected first safing inertia switch and said first diode, said first switching network including a first actuatable solid state switch connected in series with a first test resistor having a known resistance value for, when actuated, connecting said first test resistor in parallel with the series connection of said first diode and the associated resistor of the first safing inertia switch;

a second switching network connected between the connection of the first safing inertia switch and the first diode and electrical ground, said second switch network including a second actuatable solid state switch connected in series with a second test resistor having a known resistance value for, when actuated, connecting the junction between said first safing sensor and said first diode to electrical ground through said second test resistor;

a third switching network connected in parallel across said series connected second safing inertia switch and said second diode, said third switching network including a third actuatable solid state switch connected in series with a third test resistor having a known resistance value for, when actuated, connected said third test resistor in parallel with the series connection of said second diode and the associated resistor of the second safing inertia switch;

a fourth switching network connected between the connection of the second safing switch and the second diode and electrical ground, said fourth switching network including a fourth actuatable solid state switch connected in series with a fourth test resistor having a known resistance value for, when actuated, connecting the junction between said second safing sensor and said second diode to electrical ground through said fourth test resistor;

a fifth switching network connected between said source of electrical energy and the junction of the first terminal of the first front sensor and the first terminal of the second front inertia switch, said fifth switching network including a fifth actuatable solid state switch connected in series with a fifth test resistor having a known resistance value;

a sixth switching network connected between the junction of the first terminal of the first front inertia switch and the first terminal of the second front inertia switch and electrical ground, said sixth switching network including a sixth actuatable solid state switch connected in series with a sixth test resistor having a known resistance value;

means for controlling said first, second, third, fourth, fifth, and sixth solid state switches so as to selectively reverse bias said first and second diode, and establish known test currents selectively though said parallel connected resistors of said first and second safing sensors and the parallel connected resistors of the first and second front sensors;

means for monitoring the voltage values of the source of electrical energy and the voltage value present at selected circuit junctions;

means for determining the resistance value of at least one of said inertia sensors based upon said monitored voltage values; and means to warn the vehicle operator if the determined resistance value is not within predetermined limits.

14. The apparatus of claim 13 wherein said controlling means closes said first, second, third, and fifth solid state switches and said monitoring means monitors the voltage values at the anode of each said diodes and the value of the source of electrical energy and wherein said determining means determines the resistance of the first and second safing inertia sensors.

15. The apparatus of claim 13 wherein said controlling means closes said sixth solid state switch and said monitoring means monitors the voltage drop across said first and second diode and wherein said apparatus further includes second means to determine if the voltage drop across the diodes are within a predetermined diode drop limit, and wherein said means to warn the operator provides said warning if the voltage drop across the diodes is not within the predetermined limits.

16. The apparatus of claim 13 wherein said controlling means closes said second, fourth and fifth solid state switches so as to reverse bias the first and second diodes and establish one of said test currents through the first and second front inertia sensors and wherein said monitoring means monitors the value of the source of electrical energy and the voltage across the front sensor and said determining means determines the resistance value of the first and second front sensors.

17. The apparatus of claim 13 including first squib monitoring means for monitoring the voltage drop across the first squib with the fourth switch closed and then with the first, fourth, and fifth switches closed, and wherein said determining means determines the resistance of said first squib from the monitored voltage value across said first squib and said warning means warns the vehicle operator if the determined resistance of said first squib is not within said predetermined limits.

18. The apparatus of claim 13 including second squib monitoring means for monitoring the voltage drop across the second squib with the second switch closed and then with the second, third, and sixth switches closed, and wherein said determining means determines the resistance of said second squib from the monitored voltage value across said second squib and said warning means warns the vehicle operator if the determined resistance of said second squib is not within said predetermined limits.

19. A method for testing a dual airbag passive restraint system having two firing circuits, each with a series connection of several circuit components including at least two inertia sensors connected in series with a squib across a source of electrical energy, each said inertia sensor having a normally open switch and an associated parallel connected resistor, said method comprising the steps of:

isolating at least one of the inertia sensors in each of the firing circuits from the other circuit components of the associated firing circuit;

monitoring, in each said firing circuit, at least one voltage value at a component connection while at least one of said two inertia sensors in each said firing circuit is isolated;

determining from the monitored voltage value a value functionally related to the resistance of at least one of said two inertia sensors in each said firing circuit while the at least one of said two inertia sensors is isolated;

comparing the determined value against predetermined limits; and providing an error indication if the determined value is not within the predetermined limits.

* * * * *

UNITED STATES PATENT AND TRADEMARK OFFICE
CERTIFICATE OF CORRECTION

PATENT NO. : 5,187,465

DATED : February 16, 1993

INVENTOR(S) : Dana A. Stonerook, Edward J. Abeska, and Jeff R. Rochette

It is certified that error appears in the above-identified patent and that said Letters Patent is hereby corrected as shown below:

Column 16, line 30, change "switch" to -- safing --.

Column 17, line 24, after "safing" insert -- inertia --.

Column 17, line 48, change "diode" to -- diodes --.

Signed and Sealed this

Eighth Day of February, 1994

Attest:

Attesting Officer

BRUCE LEHMAN

Commissioner of Patents and Trademarks